United States Patent [19]

Felker

[11] 4,236,722
[45] Dec. 2, 1980

[54] DOUBLE ACTING CAM OPERATED CHUCK COLLET

[75] Inventor: Merle Felker, Traverse City, Mich.

[73] Assignee: Sheffer Collet Company, Traverse City, Mich.

[21] Appl. No.: 39,389

[22] Filed: May 16, 1979

[51] Int. Cl.³ ............................................... B23B 31/16
[52] U.S. Cl. ....................................... 279/118; 279/119
[58] Field of Search ......................... 279/118, 119, 110

[56] References Cited

U.S. PATENT DOCUMENTS

| | | | |
|---|---|---|---|
| 2,455,663 | 12/1948 | Eaton | 279/118 |
| 3,018,115 | 1/1962 | Blake et al. | 279/118 |

*Primary Examiner*—Gil Weidenfeld
*Attorney, Agent, or Firm*—Price, Heneveld, Huizenga & Cooper

[57] ABSTRACT

A chuck for a machine tool is disclosed having radially rockable work clamping jaws. These jaws are rocked between work clamping and work releasing positions by radially extending levers engaging axially and rearwardly extending legs on the rockable supports for the jaws. The levers form a toggle-like mechanical lock with the legs of the rockable supports which lock will not permit the jaws to release even though the lever actuating mechanism is not subjected to any restraining force. Further, the disclosure provides a mechanism which is not biased to release by the centrifugal forces incident to the use of the chuck.

11 Claims, 6 Drawing Figures

DOUBLE ACTING CAM OPERATED CHUCK COLLET

BACKGROUND OF THE INVENTION

This invention relates to chucks for machine tools and more particularly to chucks of the cam operated type. In this type of chuck, the work clamping jaws are secured to supports which are movably mounted on a chuck body. The supports are shifted between work clamping and work release positions by levers which in turn are controlled by an actuator. The actuator normally is shifted lengthwise of the chuck by suitable means such as a push rod which may be hydraulically, pneumatically or mechanically operated.

A significant problem with this type of chuck has been assurance that it will, without fail, maintain its clamping grip on the work piece. This is a serious safety matter because unintentional release of the work piece can cause serious injury to personnel as well as damage or destruction of the work piece itself. This problem is complicated by the fact that chucks operate rotationally and the higher the r.p.m. the greater the centrifugal forces tending to open the jaws of the chuck. As costs increase, the demand for higher chuck speeds to reduce production time also increases. This further complicates the problem.

To deal with this problem it is standard practice to maintain the actuator under a continuous positive force to assure its remaining in the proper position to maintain the jaws in clamped position. However, occasionally this restraining force fails and inadvertent work piece release occurs.

BRIEF SUMMARY OF THE INVENTION

This invention provides a chuck so constructed that it will not release the work piece, even under high centrifugal forces and in the absence of the application of any restraining force to the actuator. This invention provides a chuck incorporating a positive mechanical lock in the nature of a toggle. The mechanical lock occurs when the jaws are clamped and will only release when a positive releasing force is applied to the actuator. The toggle-like mechanism extends radially and, therefore, is unaffected by centrifugal forces.

BRIEF DESCRIPTION OF THE DRAWINGS

FIG. 4 is a view similar to FIG. 2, from which cross-sectioning has been omitted for clarity, illustrating the forces acting on the lever and jaw support when the chuck is locked (cross-latching has been omitted for clarity);

FIG. 5 is a fragmentary view showing a modified embodiment of this invention; and FIG. 6 is a fragmentary sectional view taken along the plane VI—VI of FIG. 5.

DESCRIPTION OF THE PREFERRED EMBODIMENT

The numeral 10 identifies a chuck body to which are mounted rocker or jaw supports 11. The various pieces of the body are assembled by cap screws 12. The rocker supports 11 are equally spaced and arranged in a circle concentric with the central axis of the chuck. Each of the supports 11 is seated in a close fitting, radial slot formed in the body 10. Three supports 11 are illustrated. However, a greater number of supports can be provided depending upon the size and purpose of the chuck.

Figure 1:
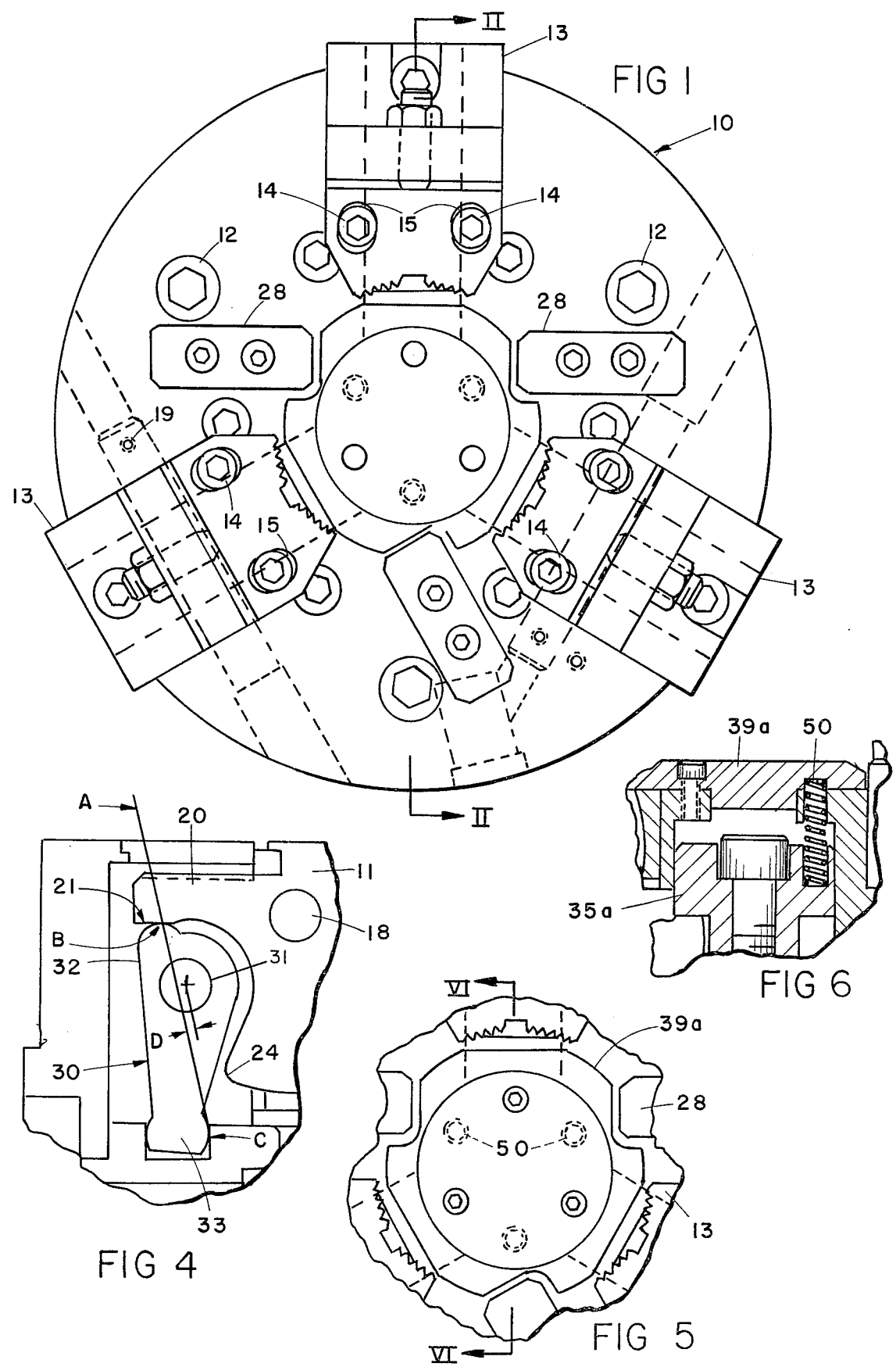
FIG. 1 is a front end view of a chuck incorporating this invention.
Figure 2:
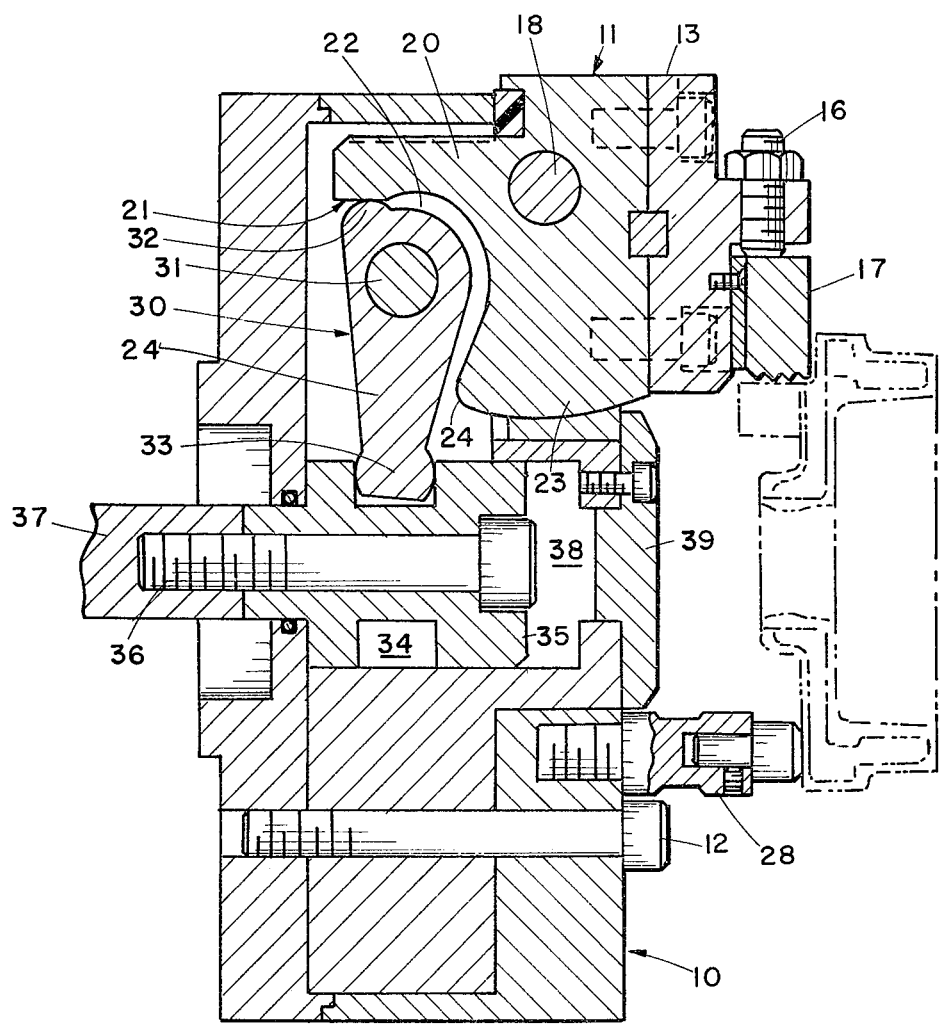
FIG. 2 is a sectional view taken along the plane II—II of FIG. 1 showing the chuck actuation mechanism in work clamping position.

A jaw 13 is detachably mounted on each of the supports and is secured by the cap screws 14 (FIG. 1). The radial position of the jaws has limited adjustability because the holes 15 (FIG. 1) for the cap screws are either oversize or radially elongated. Micro-radial adjustment of the jaws is effected through a set screw 16. Mounted to the front end of the jaw is a replaceable work piece gripping pad 17.

Each of the supports 11 adjacent its radial outer edge is pivotally mounted to the body 10 by a stud shaft 18 secured by a lock screw 19 (FIG. 1). This is a close tolerance fit because the support's movement about the stud shaft 18 must be precise and positive. The axial position of the work piece is located by the adjustable work stops 28.

All of the structure which has been described thus far is basically conventional and common to many commercially available chucks.

Each rocker support 11 has a rearwardly extending leg 20. The rearward end of the leg has an inwardly facing cam surface 21 which, when the chuck is in work piece clamping mode is substantially axially aligned with the center of the stud shaft 18 and parallel to the central axis of the chuck. Forwardly of the leg 20 the rocker support has an enlarged recess 22 which gives the rocker support a substantially L-shape with a radially extending forward leg 23. The radially inner end of the rear surface of the leg 23 projects rearwardly to form a secondary cam or lobe 24.

Received within the recess 22 is a lever 30. The lever extends radially and is pivotally mounted to the body 11 adjacent its radially outer end by a rocker shaft 31. The lever has a radially outwardly extending cam finger 32. The cam finger 32 is rounded and engages the cam surface 21.

The radially inner end of the lever has a rounded end 33 which seats in a circumferential groove 34 in the actuator 35. The actuator 35 is connected by a bolt 36 to rod 37. The rod can be connected to any suitable means capable of shifting the actuator axially in the chuck body's central passage 38. The actuator and the means to shift it axially constitute the means for opening and closing the jaws of the chuck.

The front end of the central passage 38 is closed by a cap 39 to exclude dirt, chips and other material which might interfere with the actuator's operation.

Figure 3:
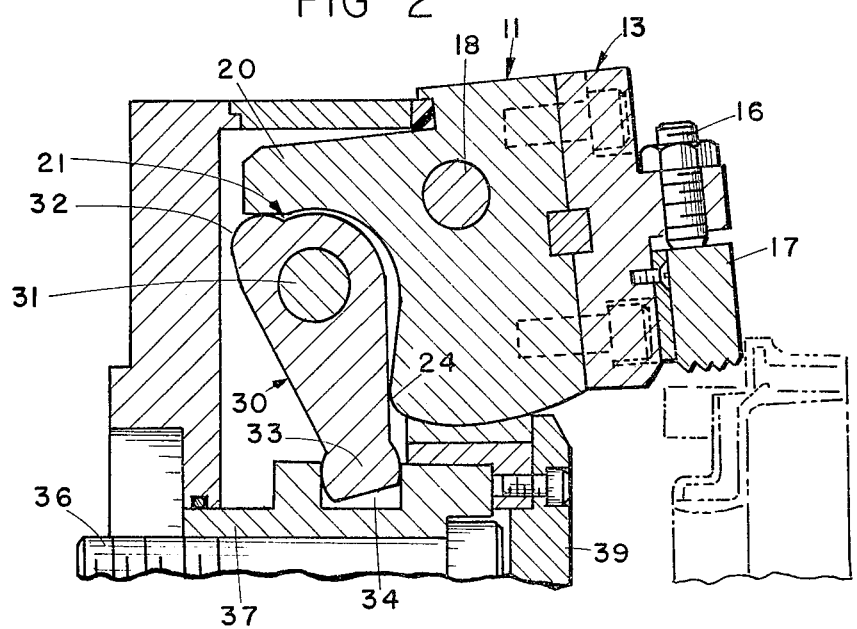
FIG. 3 is a fragmentary view similar to FIG. 2 showing the chuck actuating mechanism in work release position.

Between the rocker shaft 31 and the inner end 33, the main body of the lever 30 is positioned to engage the lobe 24 as the lever is moved to release position. In so doing, the levers apply a positive force on the rocker supports forcing them to release position (FIG. 3). Contact between the lever and the lobe 24 occurs only after the lever has shifted sufficiently toward release position that the finger 32 has moved from its cam-lock engagement with the cam surface 21. Failure to this would produce a bind within the mechanism.

The opening and closing of the chuck's jaws is controlled by the axial position of the actuator 35. When the actuator is moved forward, the jaws are shifted to work release position. When the actuator is shifted rearwardly, the jaws are moved to closed or clamping position. As the actuator is reciprocated, the lever 30 is pivoted about the rocker shaft 31 and this causes the cam finger 32 to move along the cam surface 21. The cam finger 32 is rounded so that its contact with the cam surface 21 is limited at all times to a point of tangency along the rounded surface. Further, the point of generation of the rounded surface of the cam finger 32 is so located that at no time during the pivotal movement of the lever does a radius of the rocker shaft and common to the point of generation of the rounded surface of the cam finger also pass through the point of tangency between the cam finger 32 and the cam surface 21.

As will be seen in FIG. 4, when the lever 30 is shifted to fully clamped position, a line A connecting the points of tangency B between the cam finger 32 and cam surface 21 and the point of tangency C between the rounded end 33 of the lever and the forward side wall of the channel 34 is displaced only a very slight distance D rearwardly of the center of pivot movement of the lever 30. Thus, the forces acting on the lever at the point of tangency B act largely in the radial inward direction and very minor in the rearward, circumferential direction. Since only the rearward force component is effective in urging the lever to pivot toward release position, the pressure exerted by the jaws is largely ineffective to shift the lever.

The small component of release inducing force applied to the lever 30 is inadequate to overcome the inertial and frictional resistance to axial movement of the actuator. This is particularly true since the center of rotation of the lever is located substantially closer to the point of tangency than to the actuator, thereby creating a moment arm and force couple multiplying the effectiveness of the actuator's resistance to movement.

It is also significant that when the lever 30 is in clamping position, its longitudinal axis is inclined only slightly to a plane normal to the central axis of the chuck. thus, rotation of the chuck does not generate significant forces which tend to pivot the levers out of the mechanical forces which tend to pivot the levers out of the mechanical lock position.

The result is an effective mechanical lock which positively locks the jaws in clamped position even though no mechanism such as a piston or motor is applying any force to restrain the actuator against forward movement. The rotational speed of the chuck does not affect the lock because the lever arrangement creating the lock extends radially and almost normal to the axis of rotation. Therefore, the lock is not affected by the centrifugal forces of the chuck. This provides a significant safety factor since the chuck cannot inadvertently or through excessive speed shift to release position. Further, it accomplishes this result using a simple and relatively inexpensive system.

while it is true that moving line A to pass through the central axis of the rocker shaft would produce a lock having force characteristics which would have absolute resistance to release, this is neither necessary nor practical. To do this requires substantially perfect dimensional control of both the cam finger and cam surface. Since the total movement between release and clamped positions is small, the tolerances for these surfaces would have to be impractically precise. further, only a very slight degree of wear would permit the point of tangency to pass beyond the point of maximum clamping and initiate release of the work piece. Thus, it is neither practical nor desirable to utilize such a construction.

In certain chucks, particularly those having actuators of a relatively small mass or in which the jaw design must be particularly heavy, creating high centrifugal forces, it is desirable to increase the resistance of the actuator to inadvertent movement. This can be done by providing one or more springs 50 which urge the actuator rearwardly (FIGS. 5 and 6). These springs maintain a constant rearward bias on the actuator which cooperates with the inertia of the actuator 35a to prevent unintentional forward movement. There are various ways in which the springs can be mounted including having their ends recessed in blind openings in the actuator 35a and the cap 39a. The number and strength of the springs will be governed by the amount of resistance considered necessary to assure positive operation.

It will be understood that various modifications of this invention can be provided which embody the principles of the invention. Such modifications are to be considered as included in the hereinafter appended claims, unless these claims, by their language, expressly state otherwise.

The embodiments of the invention in which an exclusive property or privilege is claimed are defined as follows.

1. A chuck having a main body portion and a plurality of jaw support rockers arranged in a circle concentric with the axial center of said chuck; first means pivotally mounting each of said rockers adjacent the outer radial edge of said chuck for radial pivotal movement; each of said rockers having a leg extending axially rearwardly therefrom; a radially extending lever for each of said rockers; second means mounting each of said levers adjacent its radially outer end for pivotal movement axially of said chuck; an actuator member mounted for axial movement and connected to the radial inner end of each of said levers; each of said rockers having an arm extending axially and rearwardly from said first pivotal mounting means; each lever having a camming finger engaging a leg of one of said rockers; when the rocker is in work clamping position said point of contact between said leg and camming finger and the point of connection between the inner end of said lever and said actuator and the point of pivotal mounting of said lever being substantially aligned and forming a mechanical lock against work release movement of said rockers.

2. A chuck as described in claim 1 wherein said camming finger is rounded and makes only a point of tangency contact with said leg.

3. A chuck as described in claim 2 wherein said leg is substantially axially aligned with said first pivot means.

4. A chuck as described in claim 2 wherein said leg has a planar camming surface, said camming surface, when said rockers are in work clamping position, being substantially axially aligned with the center of said first pivot means and being substantially parallel with an axially extending plane passing through the center of said first pivot means.

5. A chuck as described in claim 1 wherein said rockers are L-shaped, each having a radially inwardly extending leg; an axially extending lobe on the inner end of said radial leg axially aligned with said lever; said lever adjacent its inner end engaging said lobe to pivot said rocker radially forwardly and outwardly as said lever is shifted to move said rockers to work release position.

6. A chuck as described in claim 1 wherein resilient means is provided, said resilient means reacting against said body and urging said actuator rearwardly to work clamping position.

7. A chuck as described in claim 6 wherein said resilient means is a spring.

8. A chuck as described in claim 6 wherein said resilient means are a plurality of compression springs, said springs extending between said body and said actuator.

9. A chuck as described in claim 8 wherein said springs bias said actuator into work clamping position, power means for shifting said actuator axially to work release position.

10. A chuck having a main body and a plurality of jaw support rockers arranged in a circle concentric with the axial center of said chuck, each of said rockers having means for mounting a work gripping jaw and a leg extending axially rearwardly therefrom; first pivot means mounting each rocker for radial pivotal movement about a point adjacent the outer radial edge of said body; a plurality of radially extending levers, one for each of said rockers; second pivot means adjacent the outer radial end of said levers mounting said levers for pivotal movement in a radial plane; the improvement in said chuck comprising: each of said levers at its outer radial end having a camming finger engaging the leg of one of said rockers; an axially moveable actuator connected to the radial inner end of each of said levers; when said chuck is in work gripping position, the point of contact between the camming finger and said leg, said second pivot means and the connection between said actuator and said lever being substantially aligned and forming a mechanical lock against release of said jaws.

11. A chuck as described in claim 10 wherein said levers when said chuck is in work gripping position, being substantially aligned with a radial plane normal to the central axis of said chuck.

* * * * *